(12) United States Patent
Kato et al.

(10) Patent No.: US 11,960,272 B2
(45) Date of Patent: Apr. 16, 2024

(54) PRODUCTION LINE MONITORING SYSTEM

(71) Applicant: SEIKO EPSON CORPORATION, Tokyo (JP)

(72) Inventors: Kazufumi Kato, Sakata (JP); Atsushi Imai, Sakata (JP); Tomonori Ishii, Yuza-machi (JP); Koichi Saito, Tsuruoka (JP); Manabu Saito, Shonai-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 219 days.

(21) Appl. No.: 17/201,345

(22) Filed: Mar. 15, 2021

(65) Prior Publication Data
US 2021/0294316 A1    Sep. 23, 2021

(30) Foreign Application Priority Data

Mar. 19, 2020  (JP) ................. 2020-049024

(51) Int. Cl.
G05B 23/02    (2006.01)
(52) U.S. Cl.
CPC ..... G05B 23/0272 (2013.01); G05B 23/0216 (2013.01); G05B 2219/31457 (2013.01)
(58) Field of Classification Search
CPC ... G05B 19/418; G05B 23/0297; Y02P 90/02; E02F 9/264; A01D 34/008
See application file for complete search history.

(56) References Cited

U.S. PATENT DOCUMENTS

| | | | | |
|---|---|---|---|---|
| 2003/0098798 A1* | 5/2003 | Kato | ................. | G05B 23/0272 340/679 |
| 2016/0073275 A1* | 3/2016 | Inoue | .................... | H04W 24/04 455/41.2 |
| 2018/0177395 A1 | 6/2018 | Kawazu | | |
| 2021/0132597 A1* | 5/2021 | Saunders, Jr. | ........ | G05B 19/418 |
| 2022/0011736 A1* | 1/2022 | Ishimura | .............. | G05B 19/054 |
| 2022/0390927 A1* | 12/2022 | Yamashita | ......... | G05B 19/4184 |

FOREIGN PATENT DOCUMENTS

| | | |
|---|---|---|
| CN | 106161585 A | 11/2016 |
| CN | 107613852 A | 1/2018 |
| JP | 2003204199 A | 7/2003 |
| JP | 2014099010 B | 4/2015 |

OTHER PUBLICATIONS

Office Action for JP Patent Application No. JP2020049024, issued on Nov. 7, 2023.

* cited by examiner

*Primary Examiner* — Mirza F Alam
(74) *Attorney, Agent, or Firm* — CHIP LAW GROUP

(57) ABSTRACT

A production line monitoring system for monitoring a production line including a plurality of production devices is provided. The production line monitoring system includes: a plurality of terminals attached to a plurality of workers; and a server configured to communicate with the plurality of terminals via a wireless network. The server performs processing of receiving operation information about the production device and generating event information based on the operation information, processing of transmitting the event information to a first terminal and a second terminal of the plurality of terminals, and processing of transmitting event stop information to the second terminal when receiving response information transmitted from the first terminal after performing the processing of transmitting the event information.

4 Claims, 9 Drawing Sheets

FIG. 3

| ERROR CODE | CONTENT OF ERROR | OPERATION TYPE |
|---|---|---|
| E001 | REQUEST FOR MATERIAL SUPPLY | SIMPLE OPERATION |
| E002 | WORKPIECE DETECTION ERROR | SIMPLE OPERATION |
| E003 | INSPECTION NG | QUALITY-SUPPORT OPERATION |
| E004 | PRESSURE DROP | REPAIR AND TROUBLESHOOTING OPERATION |

FIG. 4

| PRODUCTION LINE ID | PRODUCTION DEVICE ID | OPERATION TYPE | TERMINAL ID | | |
|---|---|---|---|---|---|
| | | | 9B2L | AC2E | P8KE |
| PROC-01 | C010 | SIMPLE OPERATION | ○ | | |
| | | REPAIR AND TROUBLESHOOTING OPERATION | | ○ | ○ |
| | | QUALITY-SUPPORT OPERATION | | | ○ |
| | C021 | SIMPLE OPERATION | ○ | | |
| | | REPAIR AND TROUBLESHOOTING OPERATION | | ○ | ○ |
| | | QUALITY-SUPPORT OPERATION | | | ○ |
| | C022 | SIMPLE OPERATION | ○ | | |
| | | REPAIR AND TROUBLESHOOTING OPERATION | | ○ | ○ |
| | | QUALITY-SUPPORT OPERATION | | | ○ |
| | C030 | SIMPLE OPERATION | ○ | | |
| | | REPAIR AND TROUBLESHOOTING OPERATION | | ○ | ○ |
| | | QUALITY-SUPPORT OPERATION | | | ○ |
| | C040 | SIMPLE OPERATION | ○ | | |
| | | REPAIR AND TROUBLESHOOTING OPERATION | | ○ | ○ |
| | | QUALITY-SUPPORT OPERATION | | | ○ |
| | C040 | SIMPLE OPERATION | ○ | | |
| | | REPAIR AND TROUBLESHOOTING OPERATION | | ○ | ○ |
| | | QUALITY-SUPPORT OPERATION | | | ○ |
| PROC-02 | C010 | SIMPLE OPERATION | ○ | | |
| | | REPAIR AND TROUBLESHOOTING OPERATION | | ○ | |
| | | QUALITY-SUPPORT OPERATION | | ○ | |
| | C020 | SIMPLE OPERATION | ○ | | |
| | | REPAIR AND TROUBLESHOOTING OPERATION | | ○ | |
| | | QUALITY-SUPPORT OPERATION | | ○ | |
| | C030 | SIMPLE OPERATION | ○ | | |
| | | REPAIR AND TROUBLESHOOTING OPERATION | | ○ | |
| | | QUALITY-SUPPORT OPERATION | | ○ | |

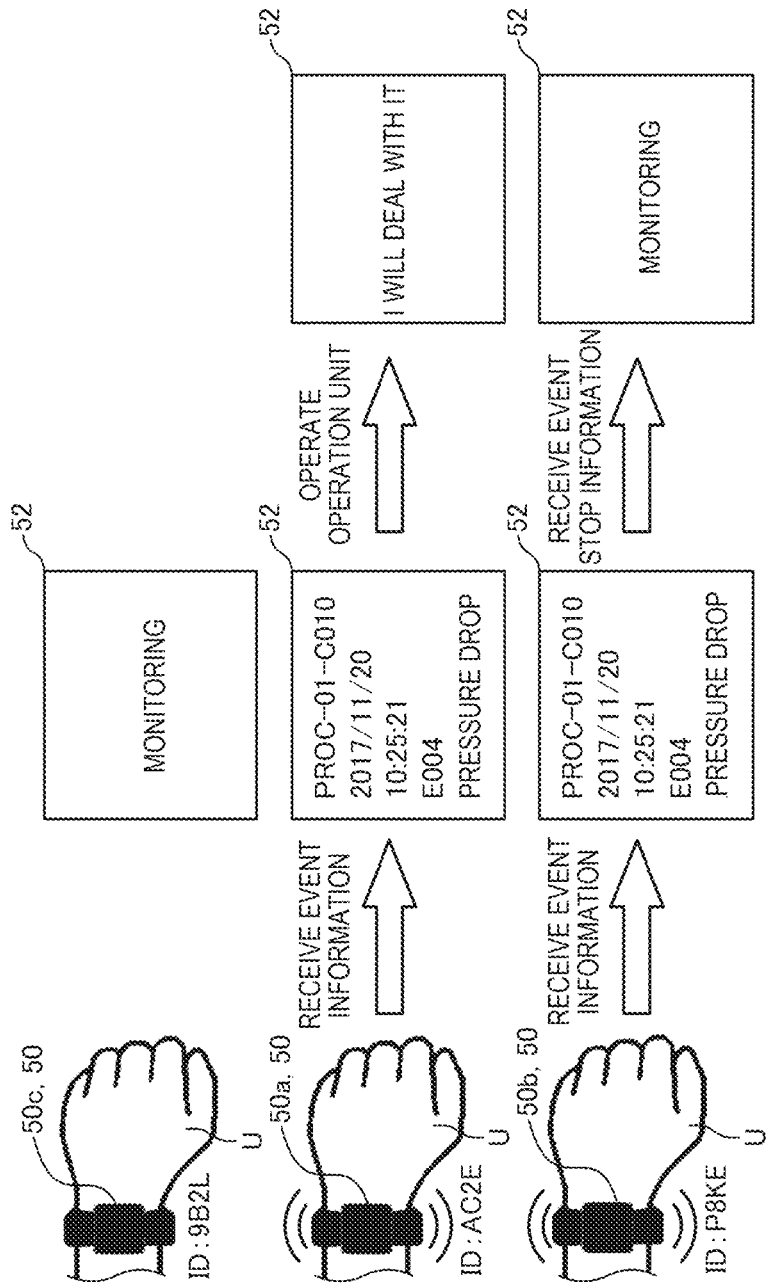

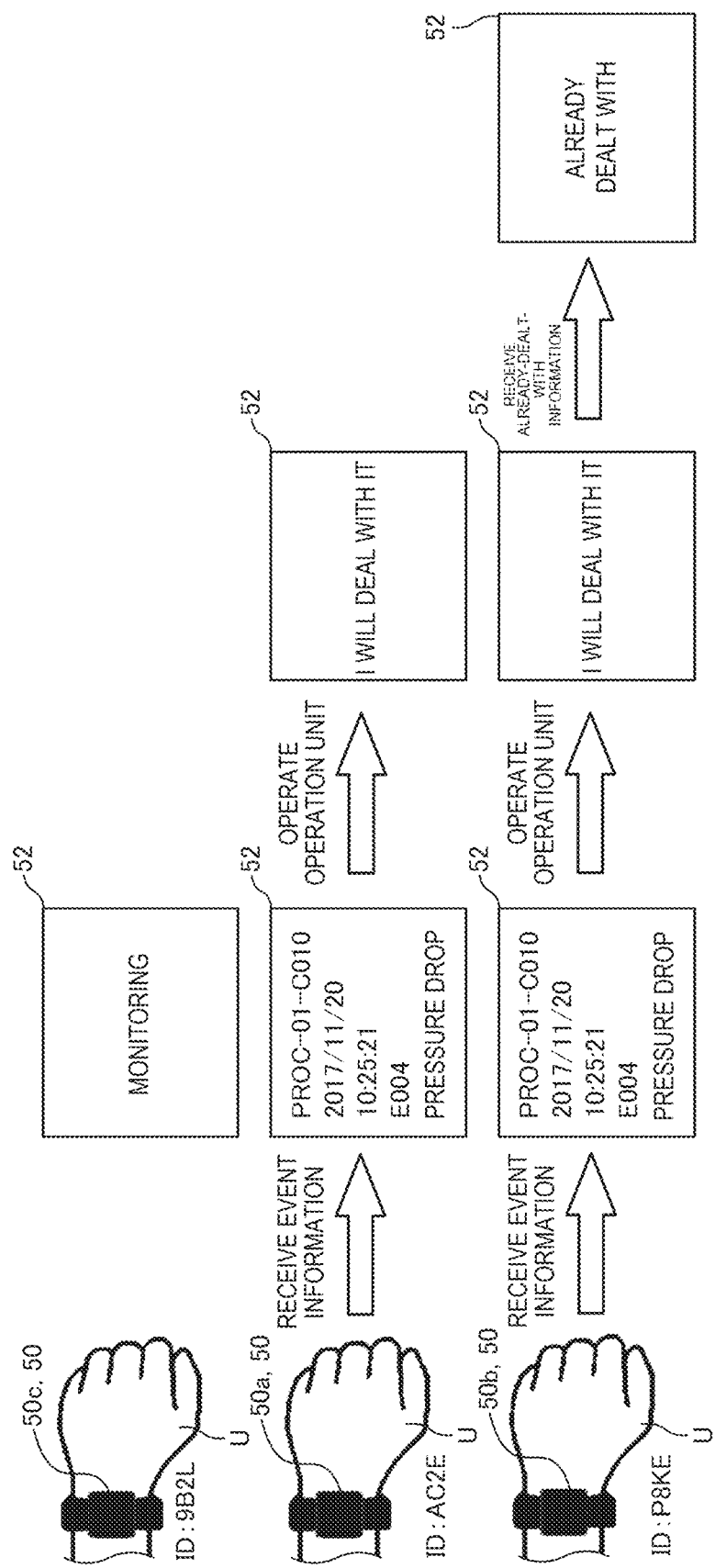

PRODUCTION LINE MONITORING SYSTEM

The present application is based on, and claims priority from JP Application Serial Number 2020-049024, filed Mar. 19, 2020, the disclosure of which is hereby incorporated by reference herein in its entirety.

BACKGROUND

1. Technical Field

The present disclosure relates to a production line monitoring system.

2. Related Art

Recently, in order to secure stable production, replacement of a plurality of production devices forming a production line by an automated robot having an automated feeding function has been underway.

When a signal tower turns on to notify an operator that such a production device has stopped due to an error, the operator needs to be in a place where the operator can see the signal tower.

JP-A-2003-204199 discloses that an operator carries a mobile phone receiving emails and that a host computer sends the operator an email including information about stopping a production device. The operator can simply go to the site when called by an email and need not constantly be in a place where a signal tower is visible, so as to monitor the signal tower.

However, according to JP-A-2003-204199, when an email including information about stopping a work machine is sent to a plurality of operators, the plurality of operators may move in order to repair the stopped production device. Therefore, the placement of operators inside the industrial plant becomes uneven and the maintenance work for a production device may be delayed where fewer operators are present. When the maintenance work for a production device is delayed, the rate of operation of the production device drops.

SUMMARY

A product ion line monitoring system according to an aspect of the present disclosure is a production line monitoring system for monitoring a production line including a plurality of production devices. The production line monitoring system includes: a plurality of terminals attached to a plurality of workers; and a server configured to communicate with the plurality of terminals via a wireless network. The server performs processing of receiving operation information about the production device and generating event information based on the operation information, processing of transmitting the event information to a first terminal and a second terminal of the plurality of terminals, and processing of transmitting event stop information to the second terminal when receiving response information transmitted from the first terminal after performing the processing of transmitting the event information.

BRIEF DESCRIPTION OF THE DRAWINGS

FIG. 3 explains operation information about the production line monitoring system according to the first embodiment.

FIG. 4 explains a table stored in a storage unit in the production line monitoring system according to the first embodiment.

FIG. 5 explains an operation of a terminal in the production line monitoring system according to the first embodiment.

FIG. 6 explains an operation of a terminal in the production line monitoring system according to the first embodiment.

DESCRIPTION OF EXEMPLARY EMBODIMENTS

Preferred embodiments of the present disclosure will now be described in detail with reference to the drawings. The embodiments described below should not unduly limit the content of the present disclosure described in the appended claims. Not all the components described below are necessarily essential components of the present disclosure.

1. First Embodiment

1.1. Production Line Monitoring System

1.1.1. Configuration

Figure 1:
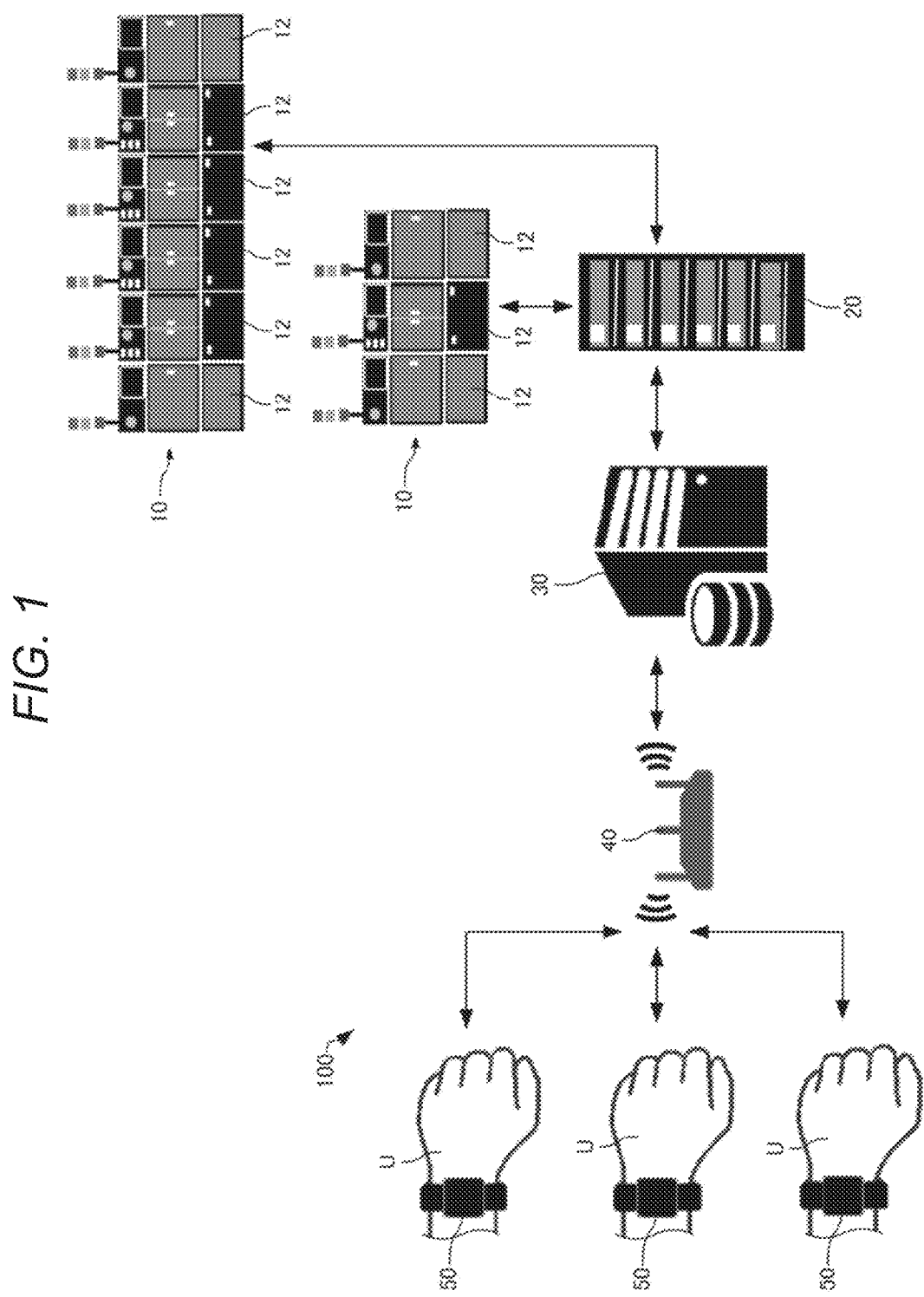
FIG. 1 schematically shows a production line monitoring system according to a first embodiment.
Figure 2:
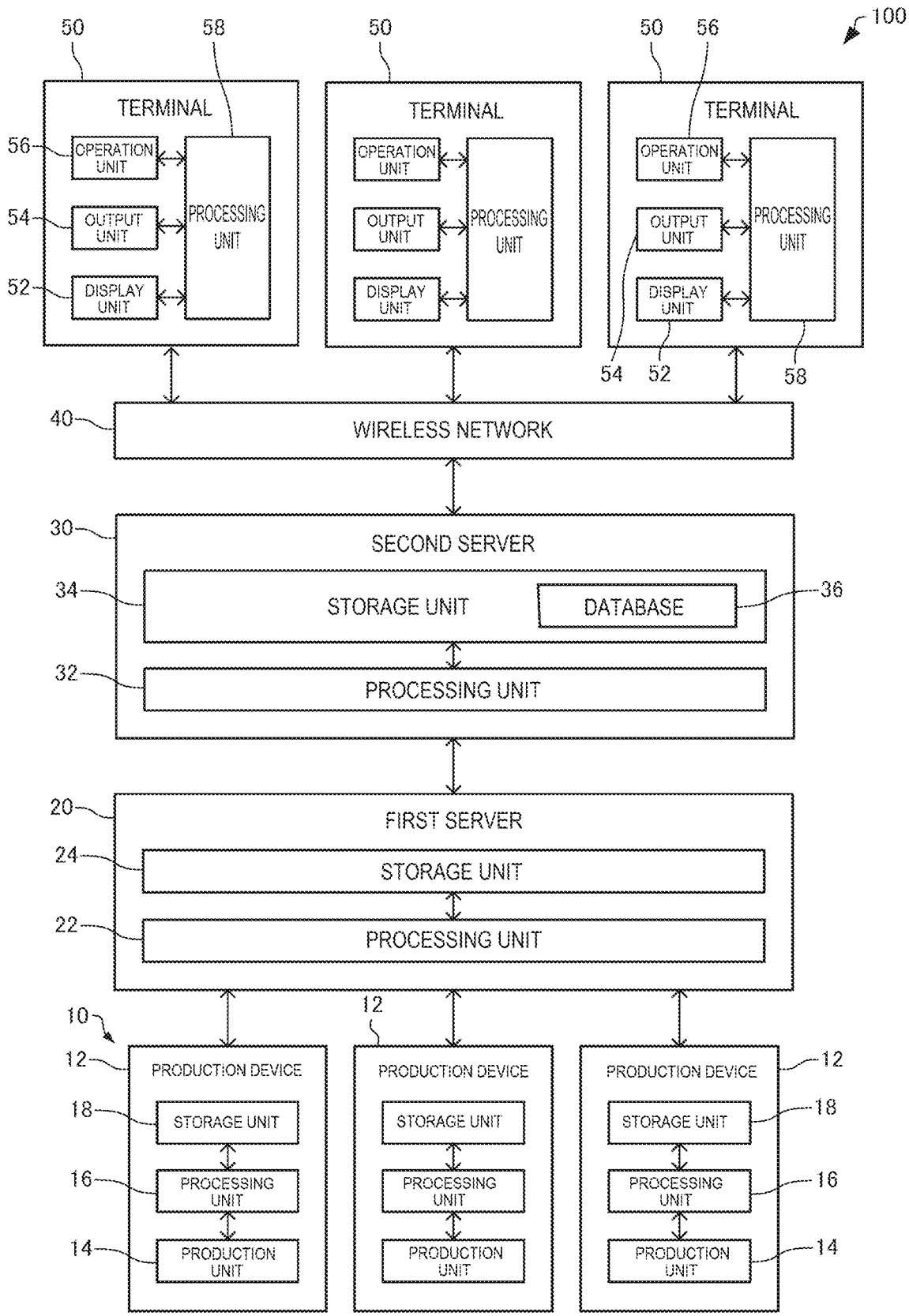
FIG. 2 is a functional block diagram of the production line monitoring system according to the first embodiment.

First, a production line monitoring system according to a first embodiment will be described with reference to the drawings. FIG. 1 schematically shows a production line monitoring system 100 according to the first embodiment. FIG. 2 is a functional block diagram of the production line monitoring system 100 according to the first embodiment.

The production line monitoring system 100 monitors a production line 10. The production line monitoring system includes, for example, a first server 20, a second server 30, a wireless network 40, and a plurality of terminals 50, as shown in FIGS. 1 and 2.

The production line 10 is arranged inside an industrial plant. As the production line 10, multiple production lines are arranged in the industrial plant. FIG. 1 shows two production lines 10 for the sake of convenience. The production line 10 includes a plurality of production devices 12. The production device 12 is a device performing predetermined processing on a target object and thus producing a product. The production line 10 produces, for example, an etched wafer as a product. In this case, the production line 10 has a production device 12 as an input device where a semiconductor wafer is inputted, a production device 12 as a pre-processing device pre-processing the inputted semiconductor wafer, a production device 12 as an etching device etching the pre-processed semiconductor wafer, a production device 12 as a post-processing device post-processing the etched semiconductor wafer, and a production device 12 as an inspection device inspecting the post-processed semiconductor wafer.

The production line 10 is not limited to a production line for etching a semiconductor wafer and may be, for example, a production line for performing photolithography on a semiconductor wafer or a production line for plating a semiconductor wafer. The product produced on the production line 10 is not limited to a semiconductor wafer and may be, for example, a structure formed of a metal, a structure formed of a resin, or the like.

The production device 12 has, for example, a production unit 14, a processing unit 16, and a storage unit 18, as shown in FIG. 2.

The production unit 14 performs processing that is the main purpose of the production device 12. For example, in the production device 12 that is an etching device, the production unit 14 is a unit performing etching and formed of a vacuum chamber, a plasma generator, and the like. For example, in the production device 12 that is an inspection device, the production unit 14 is a unit performing inspection and formed of a camera and the like.

The processing unit 16 is formed, for example, of a CPU (central processing unit), MPU (micro processing unit), DSP (digital signal processor), ASIC (application-specific integrated circuit), or the like.

The processing unit 16 performs processing of generating operation information, based on the operating state of the production unit 14. When the production unit 14 is operating smoothly, the processing unit 16 generates information that the production unit 14 is operating smoothly, as the operation information. Meanwhile, when an error occurs in the operation of the production unit 14, the processing unit 16 generates error information as the operation information. FIG. 3 explains the error information as the operation information generated by the processing unit 16 in the production device 12.

The processing unit 16 generates the error information including an error code and a content of error, as shown in FIG. 3. Although not illustrated, the error information includes an ID (identification) of the production line 10 and an ID of the production device 12 where the error has occurred, and the time of occurrence of the error. In the example shown in FIG. 3, "request for material supply", "workpiece detection error", "inspection NG", and "pressure drop" are shown as contents of error. The "request for material supply" means that a target object is not inputted to the production device 12 as the input device for a predetermined time. The "workpiece detection error" means that the operation of the production unit 14 is not detected. The "inspection NG" means that the result of inspection by the production device 12 as the inspection device is below a predetermined value. The "pressure drop" means that the pressure in the production device 12 is below a predetermined value. The contents of error shown in FIG. 3 are an example. There are other contents of error than the contents of error shown in FIG. 3.

The processing unit 16 decides an operation type for the error information, based on the content of error. In the illustrated example, "simple operation", "repair and troubleshooting operation", and "quality-support operation" are shown as operation types. The processing unit 16 decides the "simple operation" as an operation type for error information that can be dealt with without advanced knowledge about the production device 12. The processing unit 16 decides the "repair and troubleshooting operation" as an operation type for error information that needs repairing or troubleshooting and cannot be dealt with without advanced knowledge about the production device 12. The processing unit 16 decides the "quality-support operation" as an operation type for error information when the content of error is "inspection NG".

The storage unit 18 is formed, for example, of a RAM (random-access memory), ROM (read-only memory), or the like, as shown in FIG. 2. The storage unit 18 stores operation information generated by the processing unit 16. The processing unit 16 generates operation information at every predetermined time and causes the storage unit 18 to store the generated operation information.

The first server 20 can communicate with the plurality of production devices 12 via a wired or wireless network. The first server 20 receives operation information stored in the storage unit 18 of the plurality of production devices 12, at every predetermined time. The first server 20 has, for example, a processing unit 22 and a storage unit 24. The processing unit 22 is formed of a CPU, MPU or the like, similarly to the processing unit 16. The storage unit 24 is formed of a ROM, RAM or the like, similarly to the storage unit 18. The processing unit 22 causes the storage unit 24 to store the received operation information.

The second server 30 can communicate with the first server 20 via a wired or wireless network. The second server 30 receives operation information stored in the storage unit 24 of the first server 20, at every predetermined time. The second server 30 may directly receive operation information stored in the storage unit 18 of the production device 12 without using the first server 20.

The second server 30 has, for example, a processing unit 32 and a storage unit 34. The processing unit 32 is formed of a CPU, MPU or the like, similarly to the processing unit 16. The storage unit 34 is formed of a ROM, RAM or the like, similarly to the storage unit 18.

The processing unit 32 generates event information based on received operation information. The event information is information for generating an event to a worker, specifically, information including the content of error information of the operation information. An operation type is assigned to the event information, similarly to the error information.

The storage unit 34 has a database 36. FIG. 4 explains a table stored in the database 36. In the table stored in the database 36, whether or not to transmit event information to each of the plurality of terminals 50 is defined. In the table, this definition may be made for all the terminals 50. However, in the illustrated example, the definition is made for three terminals 50. The terminal 50 is given an ID.

In the table stored in the storage unit 34, terminal 50 to which event information is transmitted is defined according to the operation type for the error information with respect to each of the plurality of production devices 12. In the illustrated example, the processing unit 32 decides to transmit event information to the terminal 50 with a "○" symbol. In the table, this definition may be made for all the production lines 10. However, in the illustrated example, the definition is made for two production lines 10. The production line 10 and the production device 12 are given an ID.

The processing unit 32 transmits event information to the terminal 50, based on the table stored in the storage unit 34. For example, when event information is generated for a production device 12 "C010" in a production line 10 "PROC-01" and the operation type for this event information is "simple operation", the processing unit 32 transmits the event information to a terminal 50 "9B2L", based on the table. When the operation type for this event information is "repair and troubleshooting operation", the processing unit 32 transmits the event information to a terminal 50 "AC2E" and a terminal 50 "P8KE", based on the table. When the operation type for this event information is "quality-support operation", the processing unit 32 transmits the event information to the terminal 50 "P8KE", based on the table.

Although not illustrated, the processing unit 32 may transmit event information to all the terminals 50, depending on the content of the error information.

The wireless network 40 enables communication between the plurality of terminals 50 and the second server 30, as shown in FIGS. 1 and 2.

As the terminal, a plurality of terminals 50 are provided. The plurality of terminals 50 are attached to a plurality of workers U, one each for each worker, as shown in FIG. 1. The terminal 50 is a wearable terminal. Specifically, the terminal 50 is a wristwatch-type terminal attached to the wrist of the worker U.

The terminal 50 has, for example, a display unit 52, an output unit 54, an operation unit 56, and a processing unit 58, as shown in FIG. 2. Although not illustrated, the terminal 50 may have a storage unit.

The display unit 52 is formed, for example, of an LCD (liquid crystal display), organic EL (electroluminescence) display, EPD (electrophoretic display), touch panel-type display, or the like. The display unit 52 displays various images according to an instruction from the processing unit 58.

The output unit 54 is formed, for example, of a vibrator, buzzer, speaker, or the like. The output unit 54 generates a vibration or sound according to an instruction from the processing unit 58.

The operation unit 56 is formed, for example, of a button, key, microphone, touch panel, or the like. The operation unit 56 transmits a signal to the processing unit 58 according to an instruction from the worker U.

The processing unit 58 is formed, for example, of a CPU, MPU or the like, similarly to the processing unit 16. The processing unit 58 controls the display unit 52 and the output unit 54, based on a signal from the second server 30. The processing unit 58 also transmits a signal to the second server 30, based on a signal from the operation unit 56.

FIGS. 5 and 6 explain operations of the terminal 50. In the description below, operations of the three terminals 50 (IDs "9B2L", "AC2E", "P8KE") are described. The terminal 50 "AC2E", the terminal 50 "P8KE", and the terminal 50 "9B2L" are also referred to as "first terminal 50a", "second terminal 50b", and "third terminal 50c", respectively.

When the first terminal 50a and the second terminal 50b receive event information from the second server 30, the processing unit 58 of the first terminal 50a and the second terminal 50b changes the display on the display unit 52 from "monitoring" to the event information, as shown in FIG. 5. Specifically, the processing unit 58 causes the display unit 52 to display the ID "PROC-01" of the production line 10, the ID "C010" of the production device 12, the time of occurrence of the event, an error code "E004", and the content of error "pressure drop", as the event information. The processing unit 58 also causes the output unit 54 to vibrate. The third terminal 50c does not receive event information and therefore the display unit 52 displays "monitoring".

Next, the worker U at the first terminal 50a operates the operation unit 56 (for example, presses a button). In response to this, the processing unit 58 of the first terminal 50a causes the display unit 52 to display "I will deal with it", and also transmits response information to the second server 30. On receiving the response information, the second server 30 transmits event stop information to the second terminal 50b. The processing unit 58 of the second terminal 50b receiving the event stop information returns the display on the display unit 52 to "monitoring" and stops the output unit 54 from vibrating.

Meanwhile, when the worker U at the second terminal 50b operates the operation unit 56 before the second terminal 50b receives event stop information from the second server 30 after the first terminal 50a transmits response information to the second server 30, as shown in FIG. 6, the processing unit 58 of the second terminal 50b causes the display unit 52 to display "I will deal with it", and also transmits response information to the second server 30. On receiving the response information from the second terminal 50b, the second server 30 transmits already-dealt-with information to the second terminal 50b. The processing unit 58 of the second terminal 50b receiving the already-dealt-with information causes the display unit 52 to display "already dealt with".

1.1.2. Processing by Second Server

Figure 7:
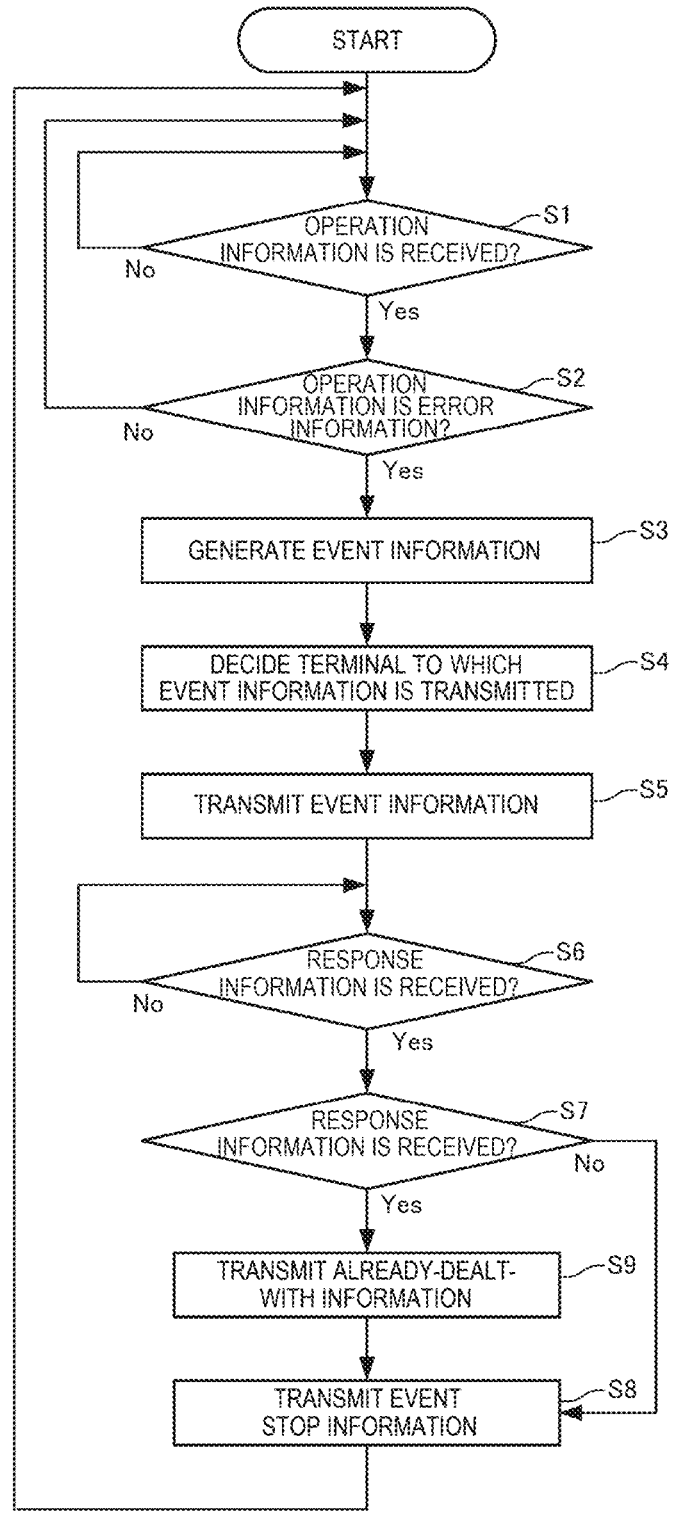
FIG. 7 explains an operation of a server in the production line monitoring system according to the first embodiment.

FIG. 7 is a flowchart for explaining processing by the second server 30 in the production line monitoring system 100. In the description below, operations of the second server 30 and the terminals 50a, 50b, 50c are described.

The processing unit 32 of the second server 30 waits until receiving operation information of the production device 12 from the first server 20 ("No" in step S1). On receiving operation information ("Yes" in step S1), the processing unit 32 determines whether the received operation information is error information or not (step S2). When it is determined that the received operation information is not error information ("No" in step S2), the processing unit 32 repeatedly performs the processing in steps S1 and S2.

Meanwhile, when it is determined that the received operation information is error information ("Yes" in step S2), the processing unit 32 performs processing of generating event information, based on the operation information (step S3).

Next, the processing unit 32 performs processing of deciding a terminal 50 to which the event information is transmitted, from among the plurality of terminals 50, based on the table stored in the database 36 (step S4). For example, when the generated event information shows that the ID of the production line 10 is "PROC-01", the ID of the production device 12 is "C010", the error code is "E004", and the content of error is "pressure drop", the operation type is "repair and troubleshooting operation", as shown in FIGS. 3 and 4. Therefore, the processing unit 32 decides to transmit the event information to the first terminal 50a and the second terminal 50b, based on the table 4.

Next, as shown in FIG. 7, the processing unit 32 performs processing of transmitting the event information to the first terminal 50a and the second terminal 50b, of the plurality of terminals 50 (step S5).

Next, the processing unit 32 waits until receiving response information from either the first terminal 50a or the second terminal 50b ("No" in step S6). On receiving response information ("Yes" in step S6), the processing unit 32 performs processing in step S7.

The processing unit 32 determines whether or not the processing unit 32 has received response information from the terminal 50 from which the processing unit 32 has not received response information in step S6, of the first terminal 50a and the second terminal 50b (step S7). That is, when the processing unit 32 has received response information from the first terminal 50a in step S6, the processing unit 32 determines in step S7 whether the processing unit 32 has received response information from the second terminal 50b or not. Meanwhile, when the processing unit 32 has received response information from the second terminal 50b in step S6, the processing unit 32 determines in step S7 whether the processing unit 32 has received response information from the first terminal 50a or not.

When the result is "No" in step S7, the processing unit 32 transmits event stop information to the terminal 50 from which the processing unit 32 has not received response information in step S6 (step S8). For example, when the processing unit 32 has received response information from the first terminal 50a and has not received response information from the second terminal 50b in step S6, the processing unit 32 transmits event stop information to the second terminal 50b.

When the result is "Yes" in step S7, the processing unit 32 transmits already-dealt-with information to the terminal 50 from which the processing unit 32 has not received response information in step S6 (step S9). For example, when the processing unit 32 has not received response information from the second terminal 50b in step S6 and has received response information from the second terminal 50b in step S7, the processing unit 32 transmits already-dealt-with information to the second terminal 50b. The processing unit 32 then performs processing in step S8.

Subsequently, the processing unit 32 returns the processing to step S1.

1.1.3. Advantageous Effects

In the production line monitoring system 100, the second server 30 performs the processing of receiving operation information about the production device 12 and generating event information based on the operation information (step S3), the processing of transmitting the event information to the first terminal 50a and the second terminal 50b of the plurality of terminals 50 (step S5), and the processing of transmitting event stop information to the second terminal 50b when receiving response information transmitted from the first terminal 50a after performing the processing of transmitting the event information (step S8). Therefore, the worker U wearing the second terminal 50b can learn that the worker U no longer needs to move to cancel the event information. The worker U wearing the second terminal 50b can carry out work that is different from the work for cancelling the event information. Thus, the rate of operation of the production device 12 can be improved.

In the production line monitoring system 100, the second server 30 includes the storage unit 34 storing a table where whether or not to transmit event information to each of the plurality of terminals 50 is defined. Based on the table stored in the storage unit 34, the second server 30 performs the processing of deciding a terminal 50 to which event information is transmitted, from among the plurality of terminals 50 (step S4). This enables transmission of the event information only to the worker U suitable for the content of the event information.

In the production line monitoring system 100, the second server 30 performs the processing of transmitting already-dealt-with information to the second terminal 50b when receiving response information transmitted from the second terminal 50b after receiving response information transmitted from the first terminal 50a (step S9). Therefore, the worker U wearing the second terminal 50b can learn that another worker is carrying out the work for cancelling the event information.

1.2. Modification Example

Figure 8:
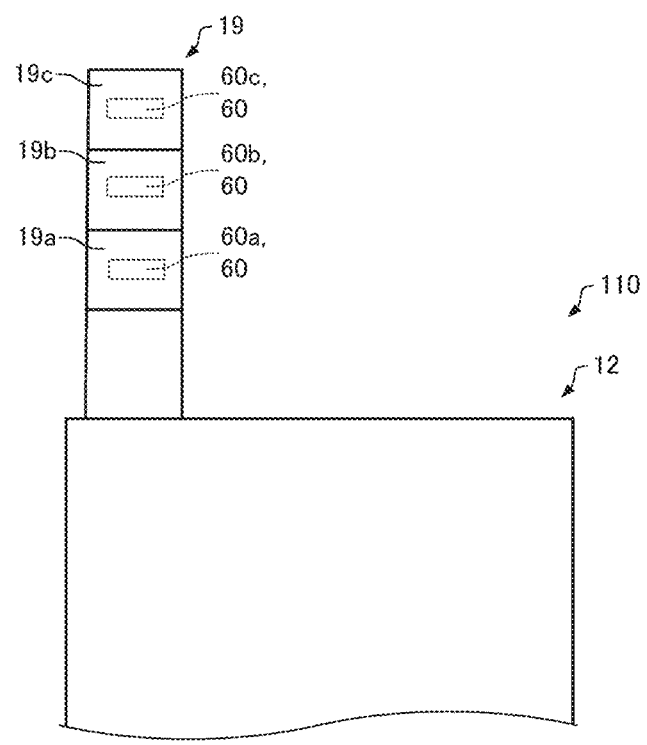
FIG. 8 schematically shows a production line monitoring system according to a modification example of the first embodiment.

A production line monitoring system according to a modification example of the first embodiment will now be described with reference to the drawings. FIG. 8 schematically shows a production line monitoring system 110 according to a modification example of the first embodiment. In the description below, components of the production line monitoring system 110 according to the modification example of the first embodiment that have functions similar to those of components of the production line monitoring system 100 according to the first embodiment are denoted by the same reference signs and are not described further in detail.

In the production line monitoring system 110, a sensor 60 is provided at a signal tower 19 of the production device 12, as shown in FIG. 8.

The signal tower 19 has, for example, a green lighting unit 19a lighting a lamp in green, a yellow lighting unit 19b lighting a lamp in yellow, and a red lighting unit 19c lighting a lamp in red. For example, when the production unit 14 of the production device 12 is operating, the processing unit 16 of the production device 12 turns on the green lighting unit 19a. When the production unit 14 has finished the operation and is waiting, the processing unit 16 turns on the yellow lighting unit 19b. For example, when the operation of the production unit 14 is interrupted, the processing unit 16 turns on the red lighting unit 19c.

The sensor 60 detects operation information about the production device 12 and transmits the detected operation information to the first server 20. The first server 20 transmits the operation information to the second server 30. The sensor 60 may transmit the detected operation information directly to the second server 30 without using the first server 20.

As the sensor 60, for example, three sensors (first sensor 60a, second sensor 60b, third sensor 60c) are provided. The first sensor 60a detects the lighting of the green lighting unit 19a as operation information. The second sensor 60b detects the lighting of the yellow lighting unit 19b as operation information. The third sensor 60c detects the lighting of the red lighting unit 19c as operation information. For example, the second server 30 generates event information when receiving operation information from the third sensor 60c.

The sensor 60 may be provided at other sites than the signal tower 19, provided that the sensor 60 can detect operation information about the production device 12.

The production line monitoring system 110 includes the sensor 60 detecting operation information. Therefore, the operation information can be transmitted from the sensor 60 to the first server 20 or the second server 30 without being stored in the storage unit 18 of the production device 12. Thus, a capacity of the storage unit 18 can be secured and the processing speed of the production device 12 can be improved.

2. Second Embodiment

A production line monitoring system according to a second embodiment will now be described with reference to the drawings. In the description below, differences of the production line monitoring system according to the second embodiment from the production line monitoring system 100 according to the first embodiment are described and similar matters are not described further.

Figure 9:
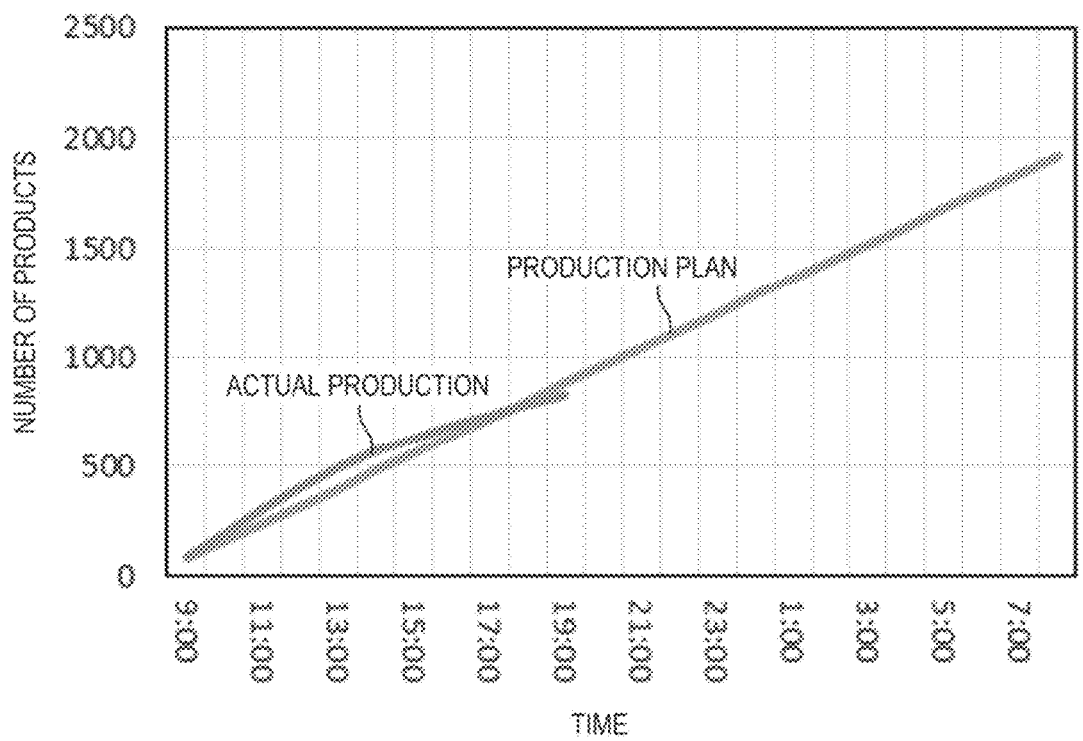
FIG. 9 is a graph showing a production plan and actual production for a production line in a production line monitoring system according to a second embodiment.

In the production line monitoring system according to the second embodiment, the second server 30 receives real-time actual production for the production line 10, as operation information. A production plan for the production line 10 is stored in the storage unit 34 of the second server 30. The processing unit 32 of the second server 30 compares the production plan with the actual production. When the actual production drops below the production plan, as shown in FIG. 9, the processing unit 32 performs the processing of generating event information. The event information is transmitted, for example, to all the terminals 50. Meanwhile, when the actual production exceeds the production plan, as shown in FIG. 10, the processing unit 32 does not perform the processing of generating event information.

Figure 10:
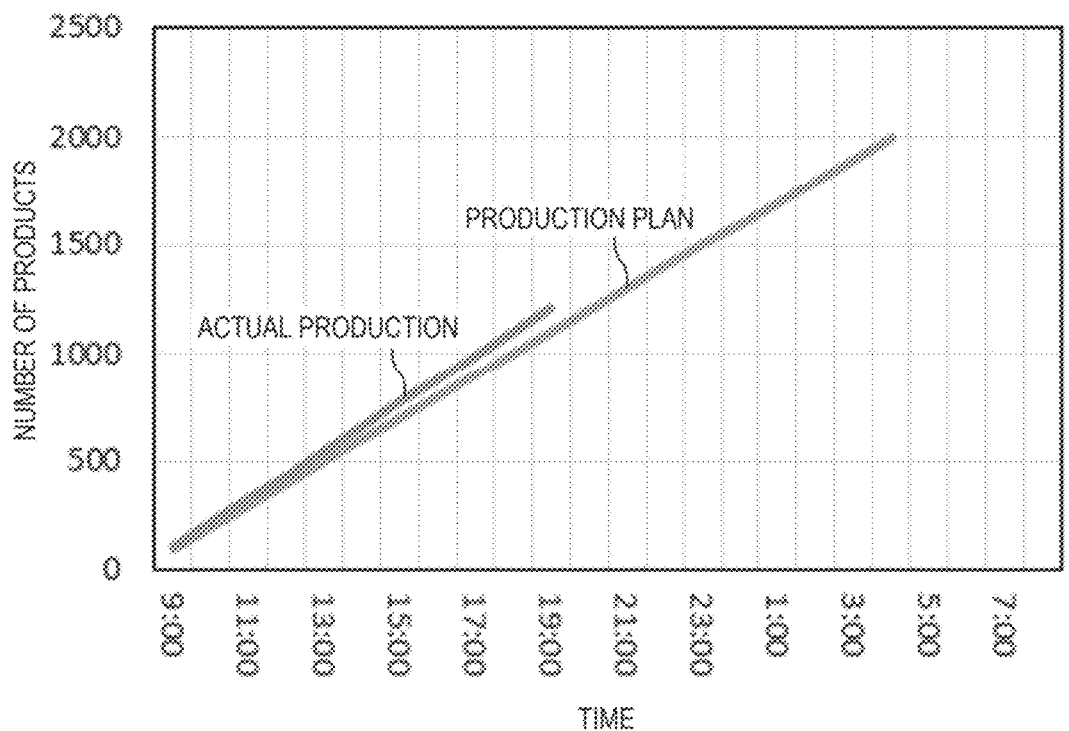
FIG. 10 is a graph showing a production plan and actual production for the production line in the production line monitoring system according to the second embodiment.

FIGS. 9 and 10 are graphs showing the production plan and the actual production for the production line 10. In the graphs shown in FIGS. 9 and 10, the horizontal axis represents time and the vertical axis represents the number of products (target objects) produced in the production line 10. The actual production is decided, for example, based on the number of times the last production device 12 responds, of the plurality of production devices 12 forming the production line 10.

In the production line monitoring system according to the second embodiment, the processing unit 32 performs the processing of generating event information when the actual production drops below the production plan. Therefore, the duration of the state where the actual production is below the production plan can be made shorter.

In the state where the actual production exceeds the production plan, the processing unit 32 may carry out a simulation based on the actual production up to this point and calculate a production forecast for the future. When the production forecast is below the production plan, the processing unit 32 may transmit information to that effect to the terminal 50.

Also, for example, in the production line 10 including two production devices 12 having the same function, even when the production forecast drops below the production plan due to a drop in the production speed of one production device 12, increasing the production speed of the other production device 12 can prevent the production forecast from dropping below the production plan, information to that effect may be transmitted to the terminal 50.

The foregoing embodiments and modification examples are simply examples. The present disclosure is not limited to these embodiments and modification examples. For example, the embodiments and modification examples can be suitably combined together.

The present disclosure includes a configuration that is substantially the same as a configuration described in the embodiments, for example, a configuration having the same function, method, and result, or a configuration having the same objective and effect. The present disclosure also includes a configuration formed by replacing a non-essential part of a configuration described in the embodiments. The present disclosure also includes a configuration achieving the same advantageous effect as a configuration described in the embodiment, or a configuration achieving the same objective. The present disclosure also includes a configuration formed by adding a known technique to a configuration described in the embodiments.

The following contents are derived from the foregoing embodiments and modification examples.

According to an aspect, a production line monitoring system for monitoring a production line including a plurality of production devices is provided. The production line monitoring system includes: a plurality of terminals attached to a plurality of workers; and a server configured to communicate with the plurality of terminals via a wireless network. The server performs processing of receiving operation information about the production device and generating event information based on the operation information, processing of transmitting the event information to a first terminal and a second terminal of the plurality of terminals, and processing of transmitting event stop information to the second terminal when receiving response information transmitted from the first terminal after performing the processing of transmitting the event information.

In this production line monitoring system, the worker wearing the second terminal can learn that the worker no longer needs to move to cancel the event information. The worker wearing the second terminal can carry out work that is different from the work for cancelling the event information. Thus, the rate of operation of the production device can be improved.

According to another aspect, the production line monitoring system may include a storage unit storing a table where whether or not to transmit the event information to each of the plurality of terminals is defined. The server may perform processing of deciding the terminal to which the event information is transmitted, of the plurality of terminals, based on the table.

This production line monitoring system enables transmission of the event information only to the worker suitable for the content of the event information.

According to still another aspect, in the production line monitoring system, the server may perform processing of transmitting already-dealt-with information to the second terminal when receiving response information transmitted from the second terminal after receiving response information transmitted from the first terminal.

In this production line monitoring system, the worker wearing the second terminal can learn that another worker is carrying out the work for cancelling the event information.

According to still another aspect, the production line monitoring system may include a storage unit storing a production plan for the production line. The operation information may be information about real-time actual production for the production line. The server may perform the processing of the event information when the actual production drops below the production plan.

In this production line monitoring system, the duration of the state where the actual production for the production line is below the production plan can be made shorter.

According to still another aspect, the production line monitoring system may include a sensor detecting the operation information.

In this production line monitoring system, the operation information can be transmitted from the sensor to the server without being stored in the production device.

What is claimed is:

1. A production line monitoring system for monitoring a production line including a plurality of production devices, the production line monitoring system comprising:
    a plurality of terminals attached to a plurality of workers; and
    a server configured to communicate with the plurality of terminals via a wireless network, wherein the server performs:
    processing of receiving operation information about a production device of the plurality of production devices and generating event information based on the operation information,
    processing of transmitting the event information to a first terminal of the plurality of terminals and a second terminal of the plurality of terminals,
    processing of receiving response information from the first terminal based on the transmission of the event information to the first terminal and the second terminal, and
    processing of transmitting event stop information to the second terminal based on the reception of the response information; and
a memory configured to store a table where whether or not to transmit the event information to each of the plurality of terminals is defined, wherein
    the table includes an identification (ID) of each of the plurality of production devices, an ID of each of the plurality of terminals, and an operation type corresponding to the event information, and
    the server further performs, based on the table, processing of determining at least one terminal of the plurality of terminals to which the event information is transmitted.

2. The production line monitoring system according to claim 1, wherein the server performs processing of transmitting already-dealt-with information to the second terminal when receiving response information transmitted from the second terminal after receiving the response information transmitted from the first terminal.

3. The production line monitoring system according to claim 1, wherein
    the memory further stores a production plan for the production line,
    the operation information is information about real-time actual production for the production line, and
    the server performs the processing of generating the event information when the real-time actual production drops below the production plan.

4. The production line monitoring system according to claim 1, further comprising a sensor detecting the operation information.

* * * * *